United States Patent
Jackson et al.

(10) Patent No.: US 10,362,162 B2
(45) Date of Patent: Jul. 23, 2019

(54) SENDING SMART ALERTS ON A DEVICE AT OPPORTUNE MOMENTS USING SENSORS

(71) Applicant: Apple Inc., Cupertino, CA (US)

(72) Inventors: Stephen P. Jackson, San Francisco, CA (US); Anil K. Kandangath, San Francisco, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/040,932

(22) Filed: Jul. 20, 2018

(65) Prior Publication Data
US 2019/0007547 A1 Jan. 3, 2019

Related U.S. Application Data

(63) Continuation of application No. 15/461,352, filed on Mar. 16, 2017, now Pat. No. 10,051,109, which is a (Continued)

(51) Int. Cl.
*H04M 3/00* (2006.01)
*H04M 1/725* (2006.01)
(Continued)

(52) U.S. Cl.
CPC ....... *H04M 1/72569* (2013.01); *H04M 19/04* (2013.01); *H04W 68/02* (2013.01);
(Continued)

(58) Field of Classification Search
CPC ... H04W 8/245; H04W 19/04; H04W 68/002; H04M 1/72519; H04M 1/72569; H04M 1/72566; H04M 1/72572; G06F 19/3437
(Continued)

(56) References Cited

U.S. PATENT DOCUMENTS

| 5,541,981 A | 7/1996 | Lynn |
| 6,265,974 B1 | 7/2001 | D'angelo et al. |
| | (Continued) | |

FOREIGN PATENT DOCUMENTS

| EP | 2469303 | 6/2012 |
| EP | 2665023 | 11/2013 |
| | (Continued) | |

OTHER PUBLICATIONS

US 9,474,045 B1, 10/2016, Jackson et al. (withdrawn)
(Continued)

*Primary Examiner* — Danh C Le
(74) *Attorney, Agent, or Firm* — Kilpatrick Townsned & Stockton LLP

(57) ABSTRACT

Measurements can be obtained from sensors to determine a state of a device. The state can be used to determine whether to provide an alert. For example, after a first alert is provided, it can be determined that the device is not accessible to the user based on the determined state, and a second alert can be suppressed at a specified time after providing the first alert. The sensor measurements can be monitored after suppressing the second alert, and a state engine can detect a change in a state based on subsequent sensor measurements. If the state change indicates that the device is accessible to the user the second alert can be provided to the user. Alerts can be dismissed based on a change in state. A first device can coordinate alerts sent to or to be provided by a second device by suppressing or dismissing such alerts.

20 Claims, 9 Drawing Sheets

Related U.S. Application Data continuation of application No. 14/731,249, filed on Jun. 4, 2015, now Pat. No. 9,603,123.

(51) Int. Cl.
| | |
|---|---|
| *H04W 68/02* | (2009.01) |
| *H04M 19/04* | (2006.01) |
| *H04W 8/24* | (2009.01) |

(52) U.S. Cl.
CPC .... *H04M 1/72519* (2013.01); *H04M 1/72522* (2013.01); *H04W 8/245* (2013.01)

(58) Field of Classification Search
USPC ................. 455/456.1, 550.1, 410; 340/521
See application file for complete search history.

(56) References Cited

U.S. PATENT DOCUMENTS

| | | | |
|---|---|---|---|
| 7,424,545 B2 | 9/2008 | Ducheneaut et al. | |
| 7,889,101 B2 | 2/2011 | Yokota | |
| 8,050,665 B1 | 11/2011 | Orbach | |
| 8,054,180 B1 | 11/2011 | Scofield et al. | |
| 8,245,252 B2 | 8/2012 | Gee | |
| 8,341,241 B2 | 12/2012 | Meuninck et al. | |
| 8,375,320 B2 | 2/2013 | Kotler et al. | |
| 8,416,073 B1 | 4/2013 | Scofield et al. | |
| 8,629,767 B2 | 1/2014 | Stefanovski et al. | |
| 8,686,852 B2 | 4/2014 | Ben-Dayan et al. | |
| 8,838,138 B2 | 9/2014 | Modali et al. | |
| 8,941,478 B2 | 1/2015 | Mirle et al. | |
| 9,122,542 B1 | 9/2015 | Nelissen | |
| 9,215,559 B2 | 12/2015 | Dave et al. | |
| 9,247,387 B2 | 1/2016 | Bonanni et al. | |
| 9,262,605 B2 | 2/2016 | Kim et al. | |
| 9,319,843 B2 | 4/2016 | Lerenc | |
| 9,327,645 B2 | 5/2016 | Raman et al. | |
| 9,489,247 B2 | 11/2016 | Evans | |
| 9,506,773 B1 | 11/2016 | Cherubini et al. | |
| 9,552,717 B1 | 1/2017 | Rudolph | |
| 9,554,050 B2 | 1/2017 | Dave et al. | |
| 9,603,123 B1 | 3/2017 | Jackson et al. | |
| 9,961,618 B2 | 5/2018 | Abraham et al. | |
| 2001/0028304 A1 | 10/2001 | I'Anson et al. | |
| 2001/0029194 A1 | 10/2001 | Ketola et al. | |
| 2002/0086680 A1 | 7/2002 | Hunzinger | |
| 2005/0102607 A1 | 5/2005 | Rousselle et al. | |
| 2005/0190080 A1 | 9/2005 | Flick | |
| 2006/0077055 A1 | 4/2006 | Basir | |
| 2006/0195518 A1 | 8/2006 | Neilsen | |
| 2006/0218029 A1 | 9/2006 | Chin | |
| 2006/0273930 A1 | 12/2006 | Godden | |
| 2007/0115837 A1 | 5/2007 | Elie-Dit-Cosaque et al. | |
| 2007/0132836 A1 | 6/2007 | Katz | |
| 2007/0241885 A1 | 10/2007 | Clipsham | |
| 2008/0079566 A1 | 4/2008 | Singh et al. | |
| 2008/0140795 A1 | 6/2008 | He et al. | |
| 2008/0150959 A1 | 6/2008 | Marui | |
| 2008/0287119 A1 | 11/2008 | Yasuda | |
| 2009/0077159 A1 | 3/2009 | Murakami | |
| 2009/0212936 A1* | 8/2009 | Granatelli .......... G05B 23/0262 340/506 |
| 2009/0249222 A1 | 10/2009 | Schmidt et al. | |
| 2009/0287418 A1 | 11/2009 | Trepagnier et al. | |
| 2010/0026526 A1 | 2/2010 | Yokota et al. | |
| 2010/0298656 A1 | 11/2010 | Mccombie et al. | |
| 2011/0084807 A1 | 4/2011 | Logan et al. | |
| 2011/0185029 A1 | 7/2011 | Jain et al. | |
| 2011/0314124 A1 | 12/2011 | Gimson | |
| 2011/0314404 A1 | 12/2011 | Kotler et al. | |
| 2012/0001843 A1 | 1/2012 | Gravino | |
| 2012/0029964 A1 | 2/2012 | Tengler et al. | |
| 2012/0069388 A1 | 3/2012 | Nakatani et al. | |
| 2012/0077463 A1 | 3/2012 | Robbins et al. | |
| 2012/0155263 A1* | 6/2012 | Long ...................... H04L 47/12 370/231 |
| 2012/0197523 A1 | 8/2012 | Kirsch | |
| 2012/0242482 A1 | 9/2012 | Elumalai et al. | |
| 2012/0244814 A1 | 9/2012 | Okayasu | |
| 2012/0265535 A1 | 10/2012 | Bryant-Rich et al. | |
| 2012/0299717 A1 | 11/2012 | Yoshino et al. | |
| 2012/0302258 A1 | 11/2012 | Pai et al. | |
| 2013/0138622 A1 | 5/2013 | Ayers et al. | |
| 2013/0244633 A1 | 9/2013 | Jacobs et al. | |
| 2013/0245986 A1 | 9/2013 | Grokop et al. | |
| 2013/0257604 A1 | 10/2013 | Mirle et al. | |
| 2013/0260784 A1* | 10/2013 | Lutz ................. H04M 1/72572 455/456.1 |
| 2013/0307681 A1 | 11/2013 | Borg et al. | |
| 2013/0316720 A1 | 11/2013 | Dwyer et al. | |
| 2013/0324093 A1 | 12/2013 | Santamaria et al. | |
| 2013/0324160 A1 | 12/2013 | Sabatellil et al. | |
| 2013/0336258 A1 | 12/2013 | Young et al. | |
| 2014/0009285 A1 | 1/2014 | Khachaturov et al. | |
| 2014/0012117 A1 | 1/2014 | Mensinger et al. | |
| 2014/0033071 A1 | 1/2014 | Gruber et al. | |
| 2014/0099921 A1 | 4/2014 | Weiss | |
| 2014/0118272 A1 | 5/2014 | Gunn | |
| 2014/0207570 A1 | 7/2014 | Cancro et al. | |
| 2014/0248910 A1 | 9/2014 | Dave et al. | |
| 2014/0253320 A1* | 9/2014 | Bender ............. H04M 1/72566 340/521 |
| 2014/0266810 A1 | 9/2014 | Hatton | |
| 2014/0269363 A1 | 9/2014 | Lee et al. | |
| 2014/0274203 A1 | 9/2014 | Ganong, III et al. | |
| 2014/0280439 A1 | 9/2014 | Hatton | |
| 2014/0280580 A1 | 9/2014 | Langlois et al. | |
| 2014/0282606 A1 | 9/2014 | Clark et al. | |
| 2014/0283074 A1* | 9/2014 | Sohn ................. H04L 63/1408 726/23 |
| 2014/0304363 A1 | 10/2014 | Mhatre et al. | |
| 2014/0342718 A1 | 11/2014 | Chen et al. | |
| 2014/0344446 A1 | 11/2014 | Rjeili et al. | |
| 2014/0351832 A1 | 11/2014 | Cho et al. | |
| 2015/0005978 A1 | 1/2015 | Nakakita et al. | |
| 2015/0061896 A1 | 3/2015 | Walther et al. | |
| 2015/0092928 A1* | 4/2015 | Jensen ............. G06Q 10/06311 379/45 |
| 2015/0137996 A1 | 5/2015 | Terashima | |
| 2015/0143281 A1 | 5/2015 | Mehta et al. | |
| 2015/0164437 A1 | 6/2015 | Mccombie et al. | |
| 2015/0181511 A1 | 6/2015 | Abraham et al. | |
| 2015/0350413 A1 | 12/2015 | Ma et al. | |
| 2015/0370884 A1 | 12/2015 | Hurley et al. | |
| 2016/0062570 A1* | 3/2016 | Dascola ................. G06F 3/0482 715/765 |
| 2016/0077674 A1 | 3/2016 | Forster et al. | |
| 2016/0086141 A1 | 3/2016 | Jayanthi et al. | |
| 2016/0117928 A1 | 4/2016 | Hodges et al. | |
| 2016/0156773 A1 | 6/2016 | Chanda | |
| 2016/0165381 A1* | 6/2016 | Kapoor ............. H04M 1/7253 709/227 |
| 2016/0187452 A1 | 6/2016 | Schillings | |
| 2016/0203018 A1 | 7/2016 | Deluca et al. | |
| 2016/0203497 A1 | 7/2016 | Tietzen et al. | |
| 2016/0309310 A1 | 10/2016 | Herman et al. | |
| 2016/0342694 A1 | 11/2016 | Allen et al. | |
| 2016/0343233 A1 | 11/2016 | Wassef et al. | |
| 2016/0349953 A1 | 12/2016 | Adler et al. | |
| 2016/0350306 A1 | 12/2016 | Hurley et al. | |
| 2016/0358451 A1 | 12/2016 | Adler et al. | |
| 2017/0048376 A1 | 2/2017 | Logan | |
| 2017/0053287 A1 | 2/2017 | Kannan et al. | |
| 2017/0162016 A1* | 6/2017 | Olson .................... G06Q 20/00 |
| 2017/0251097 A1 | 8/2017 | Jackson et al. | |

FOREIGN PATENT DOCUMENTS

| | | |
|---|---|---|
| WO | 2012022021 | 2/2012 |
| WO | 2014209374 | 12/2014 |
| WO | 2016196092 | 12/2016 |
| WO | 2016197060 | 12/2016 |

(56) References Cited

FOREIGN PATENT DOCUMENTS

OTHER PUBLICATIONS

"Trigger", EgoMotion, product data sheet, <https:iNJWW.googie.comigws_rd::ssl#q::Trigger+EgoMotion, 2015, 5 pages.
U.S. Appl. No. 14/731,249 , "Corrected Notice of Allowability", dated Nov. 14, 2016, 10 pages.
U.S. Appl. No. 14/731,249 , "Notice of Allowance", dated Jun. 6, 2016, 10 pages.
U.S. Appl. No. 14/731,249 , "Notice of Allowance", dated Nov. 3, 2016, 12 pages.
U.S. Appl. No. 15/461,352 , "Corrected notice of Allowability", dated Jul. 12, 2018, 2 pages.
U.S. Appl. No. 15/461,352 , "Corrected Notice of Allowance", dated May 7, 2018, 2 pages.
U.S. Appl. No. 15/461,352 , "Non-Final Office Action", dated Sep. 14, 2017, 11 pages.
U.S. Appl. No. 15/461,352 , "Notice of Allowance", dated Apr. 6, 2018, 10 pages.
Hoffman , "How to Automatically Run Programs and Set Reminders With the Windows Task Scheduler", available online at http://www.howtogeek.com/123393/how-to-automatically-run-programs-and-set-reminders-with-the-windows-task-scheduler, Aug. 31, 2012, 7 pages.
Nokia Iran , "Sid vs. Cortana—Happy Anniversary (Commercial)", available online at https://www.youtube.com/watchv=8e8rZxRpMlo, Jul. 28, 2014, 1 page.
OSX Daily , "Launch Files & Applications on a Scheduled Date with Calendar for Mac OS X", available online at http://osxdaily.com/2013/04/15/1aunchfile-app-scheduled-date-mac-os-x, Apr. 15, 2013, 5 pages.
Ugale et al., "Location-Based Personal Task Reminder for Mobile Users in Wireless College Campus Environment (Indoor and Outdoor).", International Journal of Computer Techniques, vol. 2, No. 1, 2015, 7 pages.

* cited by examiner

SENDING SMART ALERTS ON A DEVICE AT OPPORTUNE MOMENTS USING SENSORS

CROSS-REFERENCES TO RELATED APPLICATIONS

The application is a continuation of U.S. application Ser. No. 15/461,352, filed Mar. 16, 2017, which is a continuation of U.S. application Ser. No. 14/731,249, filed on Jun. 4, 2015, now U.S. Pat. No. 9,603,123. The disclosures of each of these references are herein incorporated by reference their entirety for all purposes.

BACKGROUND

Mobile devices (e.g., phones) can provide alerts to a user in response to a variety of triggers, such as a text message or other notifications. An alert is often missed because the user is either away from their device, or distracted by another activity.

To address this problem, the current solutions send a second alert at a fixed time later, if a user does not respond to the first alert. But, there is no guarantee that the second alert will get the user's attention any better than the first alert.

Therefore, new devices and methods are desirable.

BRIEF SUMMARY

Embodiments provide improved devices and methods for proving alerts to a user of a device. In some embodiments, smart heuristics can use sensors to determine an opportune moment that the user is likely to take notice of the alert and send a subsequent notification at that moment.

According to some embodiments, one or more measurements can be obtained from one or more sensors to determine a state of a device. The state can be used to determine whether to provide an alert. For example, after a first alert is provided, it can be determined that the device is not accessible to the user based on the determined state, and a second alert can be suppressed at a specified time after providing the first alert. The sensor measurements can be monitored after suppressing the second alert, and a state engine can detect a change in a state of the device based on one or more subsequent sensor measurements. If the state change indicates that the device is accessible to the user the second alert can be provided to the user. Alerts can be dismissed based on a change in state. A first device can coordinate alerts sent to or to be provided by a second device by suppressing or dismissing such alerts According to one example, after a first alert is provided, one or more measurements can be obtained from one or more sensors of the device. It can be determined whether the device is not accessible to the user based on the one or more sensor measurements. A second alert can be suppressed at a specified time after providing the first alert when the device is not accessible to the user. The sensor measurements can be monitored after suppressing the second alert. A state engine can detect a change in a state of the device based on one or more subsequent sensor measurements. It can be determined that the device is accessible to the user based on the change in the state of the device. The second alert can be provided to the user in response to determining that the device is accessible to the user.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
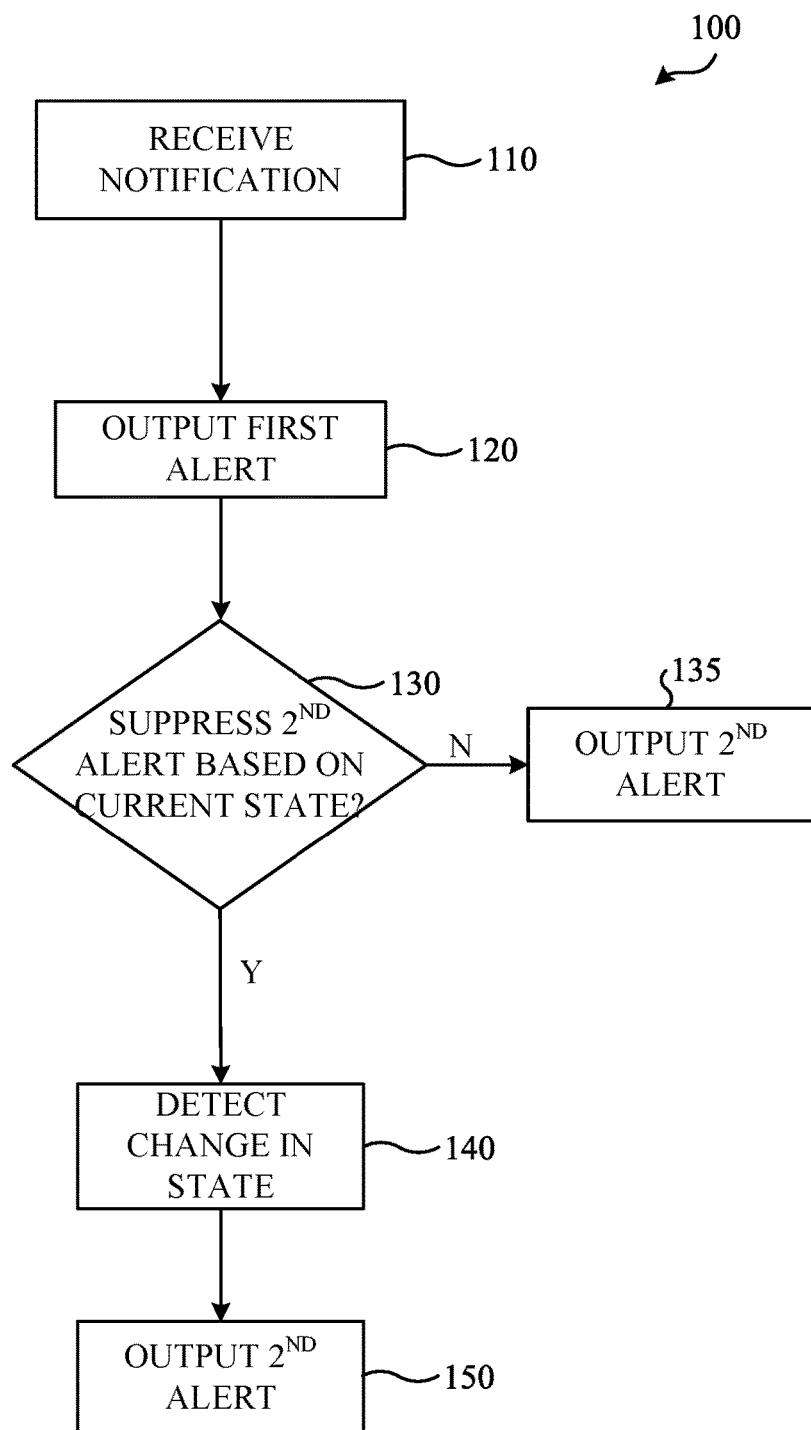
FIG. 1 is a flowchart of a method for suppressing and providing an alert according to embodiments of the present invention.

When a text message (or other notification) is received, a mobile device (e.g., a phone) buzzes once (potentially displaying the message) and then conventionally buzzes a second time a fixed time later when someone has not accessed the phone. The user may not have accessed the phone because the phone was not accessible to the user. In such a case, the second alert will not get the user's attention any better than the first alert. Thus, the second reminder alert may not be provided at an opportune time. This may cause a user to miss the message, particularly when many messages have been received.

In some embodiments, if a user does not respond to an alert, smart heuristics can use the device's sensors to determine an opportune moment that the user is likely to take notice of the alert and send a subsequent alert at that moment. The second alert can be suppressed when measurements from the sensors indicate (e.g., to a probability higher than a threshold) that the mobile device is not available to the user. As an example, motion and/or light sensors can indicate that the user is walking with the device in a pocket, and thus the mobile device is not available to the user. Other examples, the device can be left on a table or desk while the user is away, or the device can be left in a purse or backpack. As another example, a microphone sensors could determine that the device is in a noisy environment, and thus not accessible by a user.

The sensors can be monitored and fed into a state engine (which may involve various classifiers) that detect a change in state, e.g., that the device is removed from a pocket, bag, etc. The state change can indicate that the device is accessible to a user. Certain states can be defined as being available to a user, e.g., a state with sufficient light and the device is not moving.

As an example, motion activity can be used to determine when the device has transitioned from a high-dynamics state, such as running or walking, to a more sedentary state, where the device might be more accessible. As another example, if the first alert comes in when the device is in a static state (e.g., device is left on a table) and then the device is moved (e.g., beyond a threshold), it can be determined that the device is picked up (not just a bump of the table), and thus accessible. A signal to noise ratio of a wireless radio (e.g., Bluetooth or WiFi) can be used to detect when a user is near their device.

As another example, a pressure sensor can detect when a device is inside a backpack, purse, or pocket, and can detect when the device has been taken out. The movement in a closed environment can be detected from a billowing effect that can be measured by a device that is in a moving enclosed space, which is distinct from when the device is being moved in an open environment. As another example, an audio sensor can be used to detect when the ambient noise is above a certain threshold (not accessible) can then detect when the ambient noise goes below a certain threshold (accessible). As another example, an optical sensor (camera, ambient light sensor, and the like) can detect motion in the vicinity of the device, indicating the device is accessible.

I. Suppression and Providing of Alerts

Embodiments can provide a second alert when the user is more likely to respond to the alert. For instance, a vibration, noise, or display of a message can be provided when the user is more likely to respond to the alert. For example, one or more sensors of a device can detect motion of the device and determine when the user has stopped walking, which can trigger sending the second alert. Other examples can use environmental sensors (e.g., a barometer, microphone, or an ambient light sensor).

FIG. 1 is a flowchart of a method 100 for suppressing and providing an alert according to embodiments of the present invention. Method 100 can be performed by a device (e.g., a phone or other mobile device) and utilize one or more sensors of the device.

At block 110, a notification is received. In various embodiments, the notification can be a text message, a voice message, a reminder (e.g., a calendar reminder or for a task), an indication that a geo-fence has been crossed (or other use of location), and the like.

In some implementations, the notification can be generated by can application running on the mobile, e.g., an alarm application or a geo-fence application. A kernel, other system routine, or other application can receive the notification from such an application. In other implementations, the notification can be received by an application, e.g., from another device via a communications interface, such as Bluetooth, cellular, or WiFi.

At block 120, a first alert is output. The first alert can be output immediately after receiving the notification. The first alert can be output in various ways, e.g., via a vibration, audio signal, display of text associated with the notification, or any combination thereof. A kernel or other system routine can receive the notification, process the notification, and determine how to output the first alert.

At block 130, a second alert is suppressed based on a current state of the device. The current state of the device can be determined based on measured values from one or more sensors of the device. The sensors can be fed into classifiers to determine classifications for one or more particular categories. For example, a type of motion of the device is a category. A classification of the motion can provide a sub-state that corresponds to the type of motion. Other examples of categories include a noise category and whether the device is stored within an enclosure.

At block 135, if the current state indicates that the second alert should not be suppressed, then the second alert is output. The second alert can be output at a specified time after the first alert, e.g., 30 seconds after the first alert when there is no suppression. The current state can indicate that the device is accessible to the user, and thus indicate that the second alert should not be suppressed. A list can identify states for which there is no suppression of the second alert. The list can stored such that the list is accessible to an alert engine, which can compare the current state to the list.

At block 140, a change in state is detected after the second alert was suppressed. The can in state can be detected based on one or more sensor measurements. The change in state can be a state transition from a previous state to a subsequent state. The previous state can indicate that the device was not accessible to a user, and thus the second alert was suppressed at block 130. The state transition can be from one classification of a category to another classification, e.g., from one sub-state to another sub-state. For example, the transition can be from a sub-state within an enclosure to sub-state outside of an enclosure, and may be without regard for other sub-stated, e.g., a motion classification.

At block 150, the second alert is output in response to the state transition. In one embodiment, the subsequent state can indicate that the device is accessible to the user, and thus trigger outputting the second alert when the transition is detected. A list can be stored of such states that indicate (designate) that the device is accessible to the user. In another embodiment, the state transition can be of a type that is designated for providing the second alert. For example, the state transition can require the previous state to be from a particular set of previous states and the subsequent state to be from a particular set of subsequent states. Thus, the criteria of outputting may not be based solely on the subsequent state, but depend on which state was the previous state. Thus, only certain types of transitions would be a trigger for outputting the second alert.

Embodiments can also be applicable to e-mails, which normally might not have two alerts. For e-mails, there can be a VIP list for which a user especially cares about being notified. When a person on the VIP list sends an e-mail, the user might want to get a second alert so that an e-mail is not missed. In such a case, the device can be a desktop computer, as opposed to a mobile device, although also applicable to a mobile device.

II. Sub-State Classifiers and State Engine

One or more sensors of a device can be used to determine a state of the device. For example, motion sensors can determine whether the device is with a user that is running, walking, sedentary, or in a car that is being driven. Measurements from various sensors can be used to determine a state of the device. The state of the device can then be used to determine whether to provide an alert (e.g., a second alert) to a user.

A. System of Sensors and Classifiers

Figure 2:
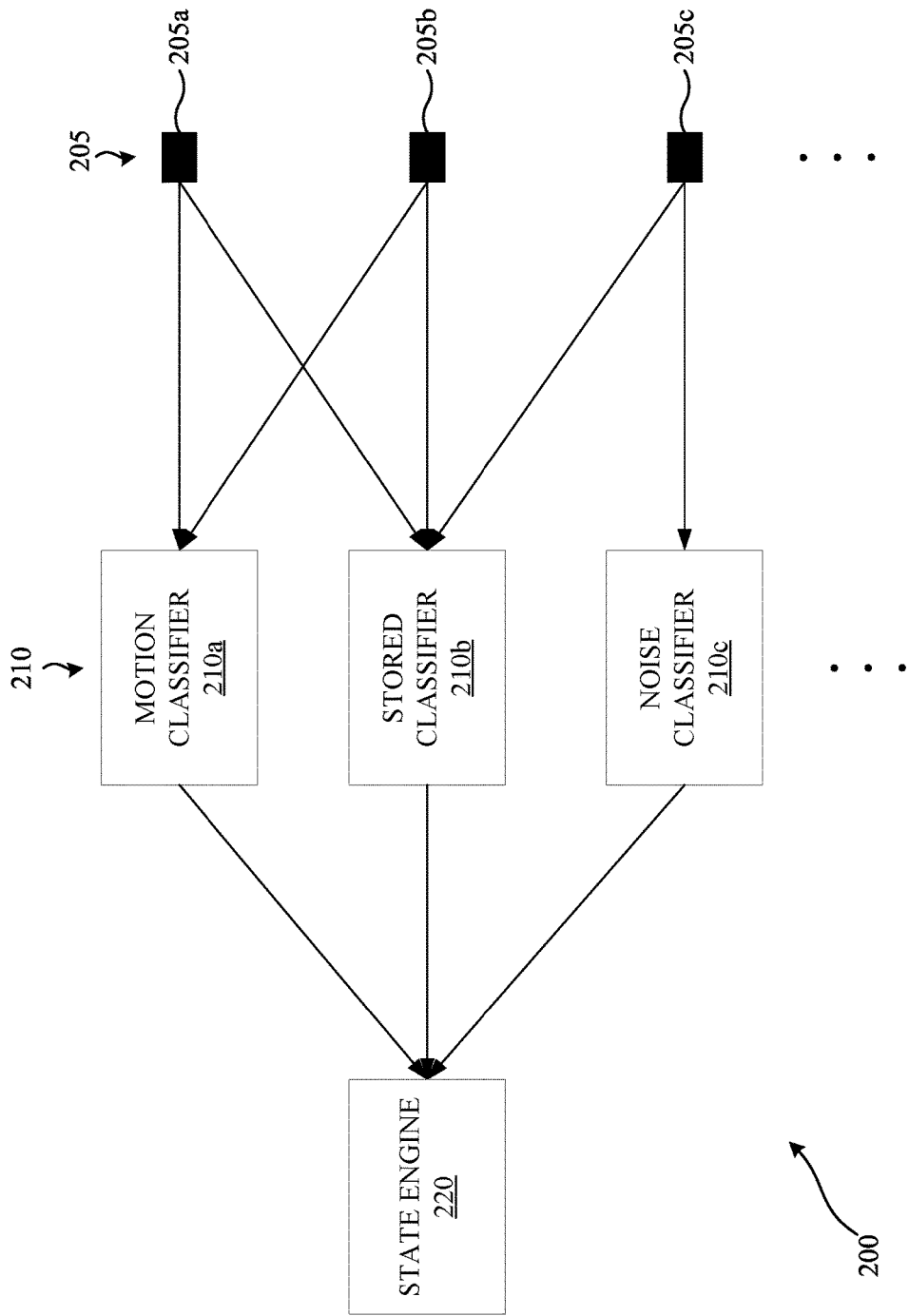
FIG. 2 shows a block diagram of a system for determining a state of a device according to embodiments of the present invention.

FIG. 2 shows a block diagram of a system 200 for determining a state of a device according to embodiments of the present invention. System 200 resides within the device for which a state is being determined. System 200 can include hardware and software components.

Sensors 205 can measure various properties of the device and the surroundings of the device. As examples, sensors 205 can include an accelerometer, a gyrometer, a barometer, a light sensor, a global positioning satellite (GPS) sensor, a microphone, and a camera. The measurement from any one sensor can be taken periodically or in response to trigger (e.g., user input or a signal from an application running on the device). Although multiple sensors are shown, just one sensor may be used for the purpose of determining the state of the device. The measurements can be sent to state classifiers.

Classifiers 210 can each determine a classification (sub-state) of the device for a given category. In the example shown, the categories include motion, whether the device is stored in an enclosure, and noise. When only one classifier is used, the sub-state for the particular category can be equivalent to the state of the device. In one embodiment, the different categories can be independent of each other in that a result of one sub-state of one category does not affect the determination of another sub-state for another category. Although a measured value for a sensor can affect the classifications determined by two classifiers, e.g., as depicted for in system 200.

Each classifier can receive sensor measurement from any one or more of sensors 205. Each classifier can use the measurements to determine a probability for one or more classifications. The possible classifications for classifier may be predetermined, and the classifier can assign a probability for each pre-determined classification based on the sensor measurement that are provided to the classifier. The classifier can send all of the classifications with the associated probabilities to a state engine 220, or just send the classification(s) with the highest probabilities (e.g., top one or two or other specified number).

In the example shown, motion classifier 210a receives sensor measurements from sensors 205a and 205b, which might be an accelerometer and a GPS sensor. Motion classifier can then determine a motion classification of the device. In one embodiment, the motion sub-state can be selected from a set of classifications, e.g., stationary, walking, running, bicycling, or moving in a vehicle (which might be separately determined for a car or a train). Other sensors can be used in various combinations. For example, a gyrometer (or gyroscope) could be used to determine angular motion, which might indicate spinning or a type of mechanized motion. A magnetometer (e.g., acting as a compass) could be used to identify changes in direction, where a rate of change can indicate a type of motion.

Stored classifier 210b receives input from sensors 205a, 205b, and 205c, which might be a gyrometer, a light sensor, and a microphone. In one embodiment, the possible classifications are stored or not stored. In another embodiment, the type of storage can be determined, e.g., in a pocket or a bag. The microphone could be used to detect muffled sounds, thereby determining that the device is stored in an enclosure.

Noise classifier 210c receives input from sensor 205c, which might be a microphone. In one embodiment, the possible classifications are stored or not stored. In another embodiment, the type of storage can be determined, e.g., in a pocket or a bag. One skilled in the art will appreciate the various combinations of sensors that can be used with each classifier. Example noise classifications can be silent, low, medium, or high noise.

State engine 220 can receive all of the classifications (sub-states) from the various classifiers and determine one or more states of the device. In some embodiments, the states is a simple enumerated combination of the separate classifications, e.g., as an array value {walking, stored, low noise). In other embodiments, the classifications can be combined to determine a state for a particular purpose, e.g., whether the device is accessible to the user or not, which is an example of a particular type of state. Other types of states can be determined for other purposes based on the classifications from the classifiers.

The operation of state engine 220 and classifiers 210 can be determined based on user input or other settings, including default settings. For example, a user can decide to save battery and switch off the functionality of determining classifications and states. Switching off of the state engine functionality can impact alerts, as well as other modules that use the state(s) and/or classification(s). The device can automatically turn off such functionality based on a trigger, e.g., based on battery level falling below a cutoff. In some implementations, turning off state engine 220 and motional classifiers 210 can turn off one or more of sensors 205.

The functionality of state engine 220 and motional classifiers 210 can be turned on based on user input. In another embodiment, an application running on the device can require a state determination, and trigger turning on the functionality of state engine 220 and motional classifiers 210.

Further details for the determination of states of a device can be found in U.S. Pat. No. 8,892,391 entitled "Activity Detection;" U.S. Patent Publication No. 2015/0050923 entitled "Determining Exit From A Vehicle;" and U.S. patent application Ser. No. 14/099,516 entitled "Mobile Device Sensor Data Subscribing And Sharing," the disclosures of which are incorporated by reference in their entirety. The device can have more than one state (each of which may have more than one sub-state), each with a corresponding probability. The probability can be required to be above a threshold to be considered a current state and subject to processing based on that state.

B. Classifications and States

The categories of motion classifiers 210 can be defined for a specific purpose, e.g., categories that are pertinent to message delivery. As the classifiers could be used for other purposes, the classifiers that are instantiated can depend on the applications that have requested to received state information. Thus, classifiers that are pertinent to more than message delivery may be running.

In some embodiments, a classifier can determine a classification based on sensor measurement over a time window. For example, activity of select sensors in the last X seconds (e.g., 10 seconds) can be used by a particular classifier to determine a sub-state for a particular category. The classifier can provide a new classification periodically based on each new time window. State engine 220 can also determine a new state at every cycle (time window).

In some implementations, a classifier can use information from previous determinations (e.g., previous classifications) to determine the classification for the current time window. For example, a linear combination can be determined of current probabilities for the classifications with probabilities determined from previous time windows. Thus, if the current information is indeterminate, but previous information was more conclusive, then the current classification would tend to keep the sub-state the same as the previous cycle.

State engine 220 can also use information from previous cycles. For example, one cycle might indicate with medium probability (or a specific value for probability) that the state is "walking in pocket," which can be reinforced by more information in a next cycle to increase the probability to high for "walking in pocket." Such a state can be maintained when data in a following cycle is indeterminate. The probability for a state or classification can provide a level of confidence for that state/classification.

More than one classifier can be directed to a same category, but have different possible sub-states. For example, two classifiers can be directed to motion. One classifier can provide a broad determined between stationary and moving. Then, a second classifier can provide specific types of moving, e.g., walking, biking, driving, running, etc. Equivalently, a same classifier can provide both the narrow and the broader classifications. If the two classifications are contradictory, the probability assigned to the classifications can be reduced.

The suppression of an alert can be different between just moving and a particular type of movement (e.g., if the particular type of movement is not determined to have a value above a threshold). For example, walking might not be suppressed, but just moving might be suppressed, since the type of motion is not specifically known, and could include running, for which suppression would be done. As another example, if a classifier is not sufficiently confident enough that the user is walking, then the state can fall into a broader motion category, where an alert is designated to be suppressed, for example.

The classifications of a category can relate to a level. For example, the classifications of a category relates to ambient light can specify an amount of ambient light. The different classifications can be numerical values or broader levels, such as low, medium, and high. The amount of change from one level to another level can be used in determining whether an alert is to be provided. Noise is another example of a category with different levels.

Another example of a category corresponds to user interaction with the device. For example, whether the person has logged in to the device, e.g., with a password or biometric scan. Further classifications of this category or other categories can user sensor measurements of whether receiving any user inputs on the device.

C. Multiple Classifications and State

As discussed above, there can be multiple classifiers, each corresponding to a different category. State engine 220 can combine the resulting classifications (including probabilities, if used) to determine a state. For example, motion classifier 210a can provide a classification of "driving." And, another classifier can provide a classification of whether the device (e.g., a phone) is mounted in a dock (e.g., any bracket) or other stabilizing device. The device can then be determined to be in a "driving mounted" state.

The specific values for the different classifications can impact the final state, which can affect whether an alert is suppressed. For example, suppression might occur for a "driving mounted" state, but not for a "driving unmounted," As the unmounted state can indicate that the user is a passenger.

As another example of combining multiple classifications, one state can be "walking in pocket" and a different state can be "walking out-of-pocket," where such states are mutually exclusive. A "walking in hand" state can also be used. There can be separate classifiers that determine the classification for each category, and state engine 220 can combine, e.g., based on probabilities for the classifications. In some embodiments, there is only one state of the phone, as determined by state engine 220. There are many ways to combine classifications, and any classification can be based on a measure of confidence in one class versus another. Further details on classifications can be found in U.S. Pat. No. 8,892,391.

D. Predominant Classification and Category

In some embodiments, a predominant category or classification can be determined. The predominant category or classification can be used in various ways. For example, a classification of a predominant category can be used as a state for determining whether an alert is suppressed or provided. As another example, a predominant classification can be used to determine when a transition has actually occurred. State engine 220 and/or motion classifiers 210 can be involved in determining a predominant category or classification.

As mentioned above, multiple classifications can be determined for various categories. State engine 220 can determine a combined state (i.e., determined from combination of classifications of various categories) and determine a transition of the combined state. In other embodiments, a predominant category can be determined, and that classification of the predominant category can effectively be used as the state. Thus, the classification of the predominant category can be determinative of whether an alert is suppressed or provided.

In one implementation, the motion category can be determined to be most important. This determination can be made based on various criteria. For example, at a current time, the device can be determined to have a high probability for being in a particular classification of the motion category, thereby making the motion category predominant. Relative probabilities among classifications of different categories can be used in making the predominant determination, e.g., if a probability for a classification of a first category can be required to be sufficiently higher than the probability for a classification of a second category to make the first category predominant.

For example, the motion classifier can identify a walking state that is very consistent, and thus is repetitive behavior. Such consistency can provide a high probability for the walking state. Then, if any sort of change in motion happens, an alert can be provided as the transition involves a transition in the classification of the predominant category.

A predominant classification can be determined based on whether a device has intermittent behavior, and a level of predominance can be used. For example, a user might walk around an office building. As the user walks, the user might stop intermittently, e.g., to let somebody pass on the stairs, to walk up the stairs, you know, or to open a door. Thus, there will be time that the user is not walking. In one embodiment, motional classifier 210a can identify the predominant measurement of walking and thus determine that classification. The predominant classification can be the classification with a highest probability, potentially with a requirement of being sufficiently higher than the classification with the second highest probability.

As another example, the device can be in a car that is driving, but makes various momentary stops (e.g. at stop signs or lights). In such a situation, motion classifier can determine that the stop is not sufficiently long, and thus keep the device in a driving state. This determination can depend on how long the time window of data is for a cycle to determine a current classification. A shorter time window can be more likely to identify a transition to a new classification. In some embodiments, multiple cycles are required to identify a transition from a predominant classification, which may be accomplished by combining probabilities across multiple cycles to calculate the probability for determining the predominant classification.

Once a classification of a category changes, that category might no longer be a predominant category. For example, if a motion classification is driving, this might take precedence over a category involving user interaction of the device or a noise level. But, if the motion classification is stationary, another category might be designated as predominant, which may depend on the current classification for that category. And, the determination might depend on how high the probability is for the classification for the other category. Thus, the predominant category may change when a classification changes, or even just when probabilities of different classifications change significantly. In such a case, whether to suppress or provide an alert can be dependent on the classification of a new category.

A priority list can be used of classifications from various categories to determine which one is predominant. For example, the list can specify driving to be predominant over any noise classification, or over certain classifications of another category. The priority list can be implemented as a decision tree or other suitable data structure. The decision tree can account for relative probabilities among different classifications to determine a priority. A formula can be used to weight the different probabilities so that a direct comparison can be made. In various embodiments, the priorities can be determined based on user input, intended use of device, and/or time of day (e.g., preference to motion for one time of day and more preference to software usage of device for other time of day). The time of day preference can be determined based on predominant classifications during that time of day. For example, if one classification of a category occurs more often than classifications of other categories, then that one classification can have a preference for being predominant during that time of day.

E. Transitions

Changes in state (also referred to as transitions) can be detected for classifications and states, and can be identified by state engine 220 and/or motion classifiers 210. A transition of a classification can be equivalent to a transition of a state when the state is defined by one classification. A transition can depend on data collected during a specific time window, and can use previous classifications/states. As for a state of a combination of classifications, state engine 220 can determine a transition of the combined state, which may be based on changes in classification(s) and/or changes in probabilities of classifications. Only certain changes in a state might signify a transition for providing an alert.

The transition would depend on the sensor measurement from sensors 205. For example, a speed measured by an accelerometer might indicate a transition from a walking classification to a running classification, potentially along with other sensor measurements to distinguish between running and driving. Where classification provides a level of the category, the change in levels can be used to determine a type of transition. For example, when a level changes from low to high or a large numerical difference, then the transition can be flagged as being significant. The amount of change for transition can be stored and carried through the logic flow to determine whether an alert should be provided (e.g., as determined by an alert engine).

Only certain transitions (e.g., from certain states to certain other states) might be allowed. Thus, these allowed transitions might inform the determination of the new state. For example, two potential states can be determined, but only one of the states might be allowed in a transition from a previous state. The allowed state can then be selected as the subsequent state. In another embodiment, the probabilities of the two states can be determined, and relative probabilities can be modified based on the allowability of the transition to each of the states. In this manner, a previous state can affect the determination of the subsequent state.

In some embodiments, once a transition is detected, state engine 220 can inform an alert engine, which may determine whether an alert should be output. For example, if a message comes in and currently the motion classification is walking, then the device might wait for a transition to a stationary state before outputting the alert. Other actions can be done in response to the transition. State engine 220 can communicate a transition and the states involved to any designated module.

Some transitions might not trigger an alert, while other transitions can trigger an alert. For example, if the user was playing a game on the device, a transition to not playing a game can be triggered to provide an alert. Such a rule could be said by user automatically determined by the device, in response to a user number checking a message from playing a game on the device. As another example, if the user has not viewed the last N (e.g., 3) alerts, then future alerts can be suppressed while the user is playing the game. When the user has left the device alone after playing the game, that transition may be a trigger that the device is accessible to the user.

The device can monitor for specific transitions that are known to be a trigger for outputting alert. A list of transitions to monitor can be dependent on the current state. For example, if the device is an left alone in a dark room, the state might include a motion classification of "stationary" and light classification of "dark." A transition to a new audio classification or light classification can be monitored as a likely transition for causing an alert to be provided. As another example, if there is motion activity, then a change in motion classification can be monitored for a transition, or a change in the barometer can be monitored (e.g., to detect the device being taken out of an enclosure). In yet another example, a transition from being stationary in a bag to non-stationary in a bag might not trigger an alert, but a transition from being stationary and not in an enclosure to being non-stationary might trigger an alert.

Multiple transitions of classifications might occur at a same time. For example, there can be one transition the motion category and another transition for the light category during a same measurement cycle. Any combination of different transitions the different categories could occur. Whether to output an alert can depend on any single transition right combination of the transitions. For example, only certain transitions of a particular category might trigger an alert. Or, only certain combinations of transitions might trigger an alert. In some implementations, one of the transitions might involve the predominant category, and that transition can be used to determine whether to provide an alert. For example, the stored category (i.e., whether the device is stored in an closure) can be the predominant category, and a change to mapping stored entry alert regardless of what the other transitions are.

Transition probabilities can be used to determine whether a transition has occurred and what the new state or classification is. For example, if the device is on the user, the device whenever e.g. perfectly stationary state. Then, if the classifiers are state engine detect that the device is perfectly stationary, and then detect sensor measurements that suggests that the user is walking with the device in s bag or in a pocket, then the new state is likely walking in a bag, and not in a pocket. Such a determination can be made since there is a low transition probability of going from perfectly stationary to walking in a pocket, as the user would need to pick up the device from the stationary location and put it in the pocket. Accordingly, there may be a subset of states for which a transition is allowed (or probable), which can affect the determination of what the new state is.

The probability of the device being in a particular state can be used to determine a probability that the device is not accessible to a user. For example, if the state is one designated as not being accessible to a user, then the probability of being in the particular state can be taken as the probability that the device is not accessible to a user. The probability of that the device is not accessible to a user can be compared to a threshold (e.g., a confidence threshold). The device can be determined to not be accessible to the user when the probability exceeds the threshold.

F. Sensors

Below are some examples of certain types of sensors. The sensors can be used in determining a classification/state and transitions between classifications/states.

1. Inertial Sensors

Inertial sensors can measure various types of motion, orientation, and changes thereof. For example, an accelerometer can measure acceleration from rest to velocity, or from one velocity to another velocity. A gyrometer (or gyroscope) can measure and orientation, e.g., a three-dimensional position of the device, which may specify various tilt angles. The orientation can include whether the device is face up or face down. Changes in such orientation can also be measured. A magnetometer can be uses a compass to determine an orientation relative to the magnetic poles of the Earth.

2. Environmental Sensors

Environmental sensors can measure the surroundings of the device. For example, an ambient light sensor can detect an amount of light around the device, which may help to determine whether the device is within an enclosure. A proximity sensor can determine whether an object is nearby the device. In such an example, an infrared sensor can be used to detect the object and/or the capacitance sensor can detect whether an object is near a display screen of the device, as may occur when the display screen is raised to a user's face when taking a phone call). Wireless communication interfaces could also be used to determine whether an object is interfering with the signal, and thus whether an object is within proximity.

Another environmental sensor is a noise sensor (e.g., a microphone). A noise sensor could detect that the phone has been left alone in a room (e.g., no noise), and be used to detect a transition to a state with noise when a person enters the room. Such a transition can trigger an alert, is it may be presumed that the device is now accessible to a user. In an alternative fashion, a very high noise classification might cause an alert to be suppressed (e.g., in a crowded club and less likely to notice and alert), and a transition to a lower noise level can cause an alert to be provided.

A humidity sensor can be used to detect whether the device is within an enclosure, or even a specific type of closure. For example, the humidity would increase the device is in a pocket, as opposed to being out-of-pocket. Other environmental sensors can include gas or salinity sensors.

A temperature sensor could be used to infer if the device was indoors or outdoors, or infer if the device was in a pocket or a bag. A low temperate of outdoors is more likely to be available, as the user likely would have the device outside of any pocket.

3. User Sensors

One or more sensors can also sense a property of a user. For example, a heartrate sensors could be used to infer if the person is engaged in vigorous activity. If the user was engaged in vigorous activity, the device might be considered unavailable to the user.

4. Location

The location of the device can be determined using GPS. In another example, a barometer could be used as a pressure sensor to determine an altitude of the device. In this manner, the barometer can be used to determine where on a hiking trail person of his, potentially combination with a GPS sensor. Further, a GPS receiver could count the number of visible satellites and infer if the device was indoors or outdoors.

III. Using Accessibility of Device

Some embodiments can use a state of the device to determine whether or not the device is accessible. When the device is accessible, he can be assumed that the user is more likely to be aware alert. Thus, the alert can be sent at an opportune time. The accessibility of the device can be based on whether the user has the device. States that indicate that the user does not have a device (e.g., that the devices stationary on a flat surface) can be taken as not being accessible to the user. In some implementations, a device may not be accessible when a particular application of the device is not accessible to the user. For example, if the user is playing a game, a messaging application may not be accessible to a user, or an alert screen may not be accessible, as that would interrupt the game.

A. System for Providing Alerts Based on Accessibility

Once a state is used to determine the accessibility of a device, the device can determine whether to provide an alert. Alerts that have been suppressed can be queued, and all or portion can be provided in response to a transition of the device being accessible. The determination of which states correspond to the device being accessible candidate in various ways and with various modules.

Figure 3:
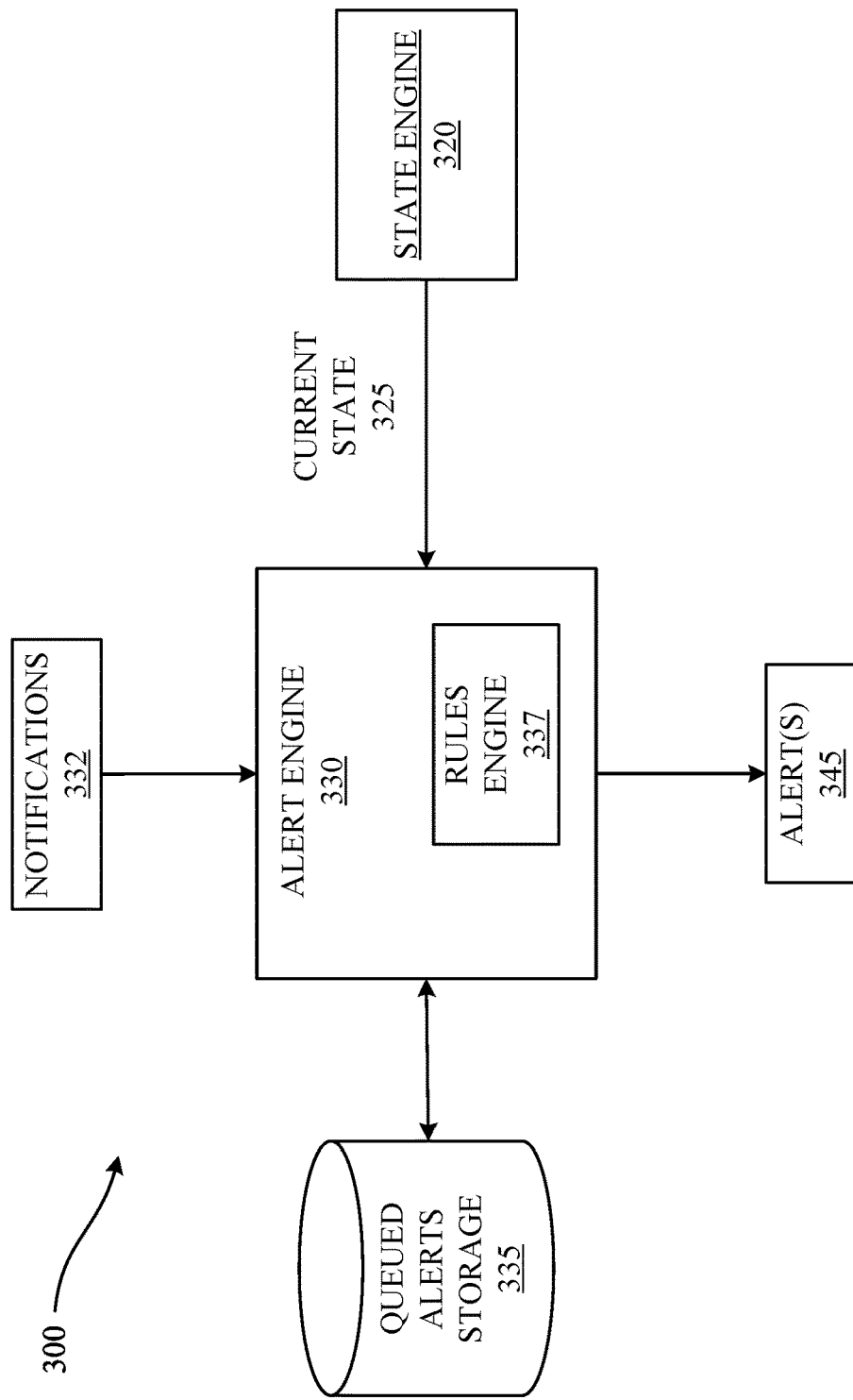
FIG. 3 shows a block diagram of a system for providing one or more alerts according to embodiments of the present invention.

FIG. 3 shows a block diagram of a system 300 for providing one or more alerts according to embodiments of the present invention. System 300 resides within the device that is providing the alert. System 300 can include hardware and software components.

State engine 320 can provide a current state 325 to alert engine 330. State engine 320 can correspond to state engine 220 of FIG. 2. State engine 320 can periodically provide current state 325, e.g., at the end of cycles that use sensor measurements from a specified time window. In other embodiments, state engine 320 can provide current state 325 when the state changes. State engine 320 can store the current state rest identified with a state transition occurs.

In various embodiments, current state 325 can correspond to a single classification from only one classifier being used, a classification of the predominant category, a combination of classifications, or be specified by the combination of classifications (e.g., specified by a table defining a state for a particular combination of classifications, with a number of possible states being less than the number of permutations possible classifications).

Alert engine 330 can receive notifications 332. An alert (e.g., a second alert) corresponding to a notification can be suppressed, e.g., based on a state at a time the notification was received. The determination of whether to suppress the alert can be performed using methods described herein.

Information about the suppressed alerts can be queued and stored in a queued alerts storage 335. An alert can be stored with various information, such as a text corresponding to the notification, a manner for outputting the alert, and application corresponding to the notification or the alert, the priority of the alert, a time the corresponding notification was received, an identifier for a type of the alert, or other suitable information. Storage 335 can be part of other memory, and the queued alerts can be stored together in a data structure designated for queuing alerts.

When alert engine 330 receives current state 325, alert engine 330 can determine whether one or more alerts should be provided based on current state 325. In some embodiments, alert engine 330 can store previous states to determine whether a transition has occurred to current state 325. In other embodiments, state engine 320 can indicate whether a transition has occurred when sending current state 325, or may only send a new state when a transition has occurred.

Alert engine 330 can include a rules engine 337 for determining whether an alert is to be provided based on current state 325, which may include the type of transition to current state 325. Rules engine 337 can include one or more criteria for identifying the device as being accessible. For example, rules engine 337 can include a list of states that act as a trigger for providing alerts. As another example, rules engine 337 can include a list of transitions designated for acting as a trigger for providing alerts, and thus information about a previous state is used to determine whether an alert is provided.

Rules engine 337 can use an amount of change from one state to another to determine whether the transitions should trigger the providing of an alert. For example, the ambient light might increase significantly (e.g., a light difference greater than a threshold, as may occur from a low classification to a high classification). For example, the previous state might be "dark," and the light classification is the only change, rules engine 337 can check the amount of change in the light classification. If the change in light classification is significant enough (e.g., difference is greater than a threshold), then one or more queued alerts can be provided. Thus, the method may determine that a particular transition could possibly trigger an alert, but provide further analysis by determining an amount of change corresponding to the transition. A particular transition may multiple changes, each of which may include a level of change they may be used to determine whether to provide an alert.

Different rules can be used for different alerts originating from different notifications. For example, a notification about a text message may have one set of criteria for when the device is considered accessible to a user so as to identify an opportune moment for providing an alert about the text message. And, a notification about a reminder may have a different set of criteria for when the device is considered accessible to the user so as to identify an opportune moment for providing an alert about the reminder. In some embodiments, alert engine 330 can identify the type of queued alerts in storage 335, and only check criteria for those queued alerts in storage 335.

Once rules engine 337 determines that at least one type of alert is to be provided to the user, alert engine 330 can retrieve any corresponding alerts from queued alerts storage 335. The retrieved alerts can then be output as alert(s) 345. The queued alerts can be stored with an alert identifier corresponding to the type of notification that generated the alert. Rules engine 337 can specify an alert identifier for the type of alerts that are to be output based on the criteria being satisfied. Alert engine 330 can use the alert identifier to retrieve corresponding alerts from storage 335. If there are not different types of alerts or types of alerts are to be output, an alert identifier may not be needed.

B. Method

Figure 4:
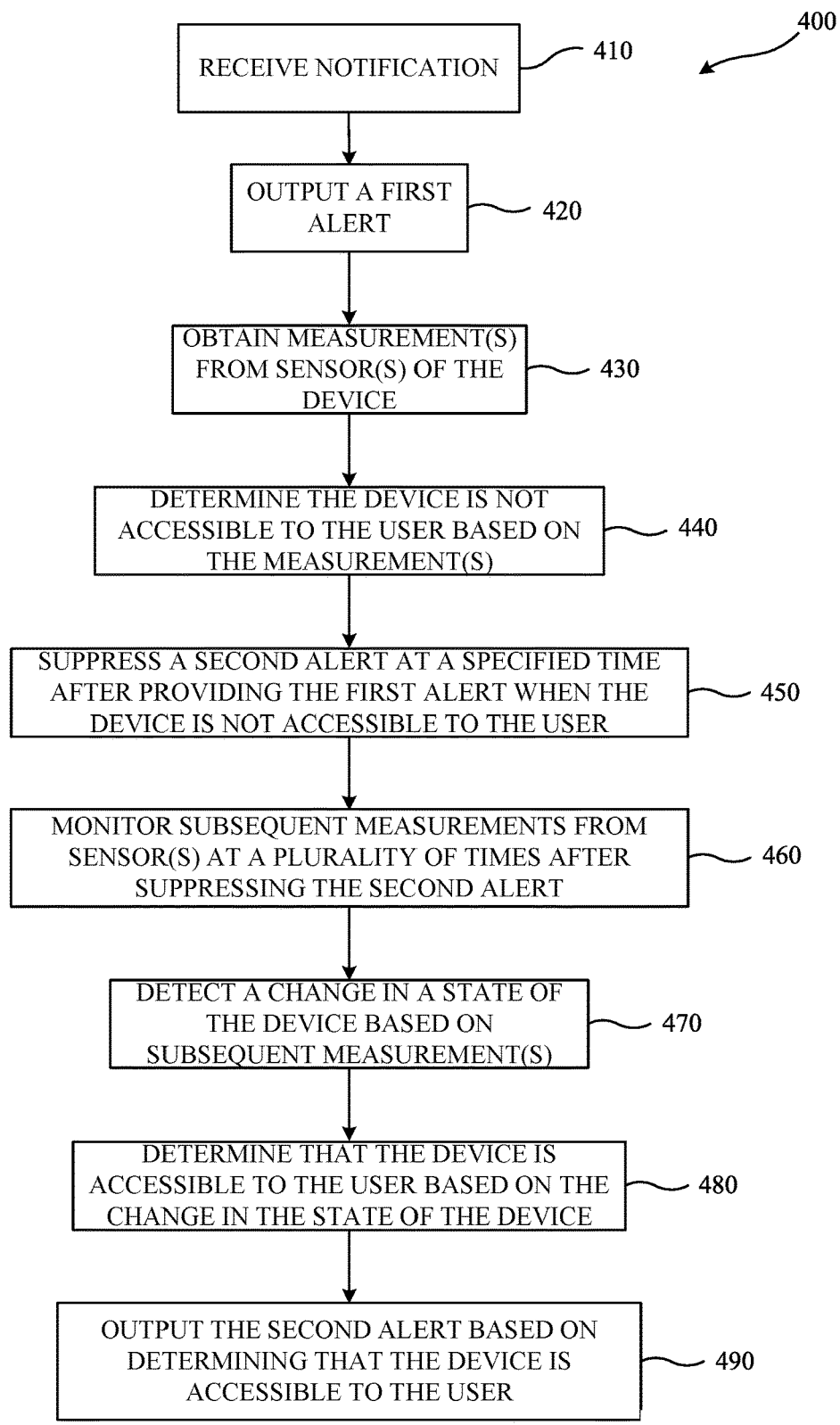
FIG. 4 is a flowchart illustrating a method of providing alerts using a device according to embodiments of the present invention.

FIG. 4 is a flowchart illustrating a method 400 of providing alerts using a device according to embodiments of the present invention. Method 400 can be performed entirely or partially by the device. As various examples, the device can be a phone, tablet, laptop, or other mobile device, as well as a desktop computer.

At block 410, the device receives a notification. For example, the device can receive a text message via a cellular network. As another example, a software became internal to the device can generate a reminder (or other notification), as may occur at a particular time and/or location of the device. Thus, the device can receive the notification from itself.

At block 420, the device outputs a first alert in response to receiving the notification. The first alert can provide an initial indication to the user that a notification has been received. The first alert can provide information, e.g., displaying text associated with the notification. The first alert can be provided in various ways, e.g., using audio, vibration of the device, display of text, and combinations thereof. A user can acknowledge receipt of the first alert various ways, e.g., selecting a button of the device, moving the device in a particular manner, or other predetermined action. The user may not acknowledge receipt of the first alert, as is described herein, and thus the device may determine an opportune time to provide a second alert.

At block 430, one or more measurements are obtained from one or more sensors of the device. Examples of the types of sensors are described herein, and include software sensors that measure a current operation of an application (e.g., whether the application is being used by the user, and potentially how the application is being used). The sensor measurements can be obtained periodically from the sensors or in response to a trigger. For example, if a change is detected in one sensor, then measurements can be requested from one or more other sensors. The sensor itself could trigger providing a measurement, e.g., a sensor can produce electrical signal under certain circumstances, such as motion. The one or more measurements can be obtained by one or more classifiers running on one or more processors of the device.

At block 440, it is determined that the device is not accessible to a user based on the one or more measurements from the one or more sensors of the device. In various embodiments, the determination that the device is not accessible to the user can be made by a state engine or an alert engine. The one or more measurements can indicate a current state of the device, and that current state can be compared to a list of states that are designated to not be accessible to the user.

At block 450, when the device is not accessible to the user, a second alert is suppressed at a specified time after providing the first alert. The second alert is suppressed, the second alert can be stored for later access. For example, the second alert can be queued in a storage (e.g., storage 335). A stored entry for the second alert can include various information, as is described herein.

The specified time can correspond to a predetermined amount of time after the notification was received or after the first alert was output. For example, the device can be configured to provide the second alert 30 seconds (or other time) after the first alert. Before providing the second alert, the device can check whether the second alert should be suppressed. In other embodiments, the determination of the accessibility of the device can be determined prior to a default time for providing the second alert. Thus, in some implementations, if the device is determined to not be accessible at any time before the default time for providing the second alert, the device can determine to suppress the second alert. Such a determination would still occur at a specified time.

At block 460, subsequent measurements from the one or more sensors of the device can be monitored at a plurality of times after suppressing the second alert. The subsequent measurements can correspond to a particular time window. The subsequent measurements of the time window can be stored in be identified as occurring a given cycle corresponding to the time window. In various embodiments, measurements from a single cycle can be used for later analysis, or measurements from multiple cycles can be used.

At block 470, a state engine executing on the device detects a change in a state of the device based on one or more of the subsequent measurements from the one or more sensors at one or more of the plurality of times. For example, state engines 220 or 320 can detect a change in the states. The change may correspond to a particular transition from one state to another state. Such a change in state may correspond to any of the embodiments described herein for changes/transitions and classifications and states.

At block 480, it is determined that the device is accessible to the user based on the change in the state of the device. The determination of the accessibility of the device can be based on various factors as are described herein. For example, only certain transitions from a previous state to a subsequent state may indicate that the device is accessible. In other embodiments, the subsequent state can specify the accessibility of the device, without a reference to a previous state. The change in state may include only an identification of the subsequent state, include only an identification of a particular type of transition, or include various combinations of information.

At block 490, the device outputs the second alert based on determining that the device is accessible to the user. Given that the device is determined to be accessible to the user, the device can determine that it is an opportue to output the second alert. The second alert can be output in any suitable manner. In some embodiments, the second alert can be output in a different manner if it was suppressed, as compared to how a second alert would have been output had the second alert not been suppressed.

IV. Suppression of First Alert

In some embodiments, the device can determine whether the first alert should be suppressed based on a state of the device. For example, a user may be driving (device is in driving state) when a notification is received, the device can determine not to provide the first alert, so as not to disturb the user. The device can wait to provide the alert to the user, e.g., until the device has reached a destination. The device can determine a destination has been reached when a state corresponds to the user having exited the vehicle, as may be determined according to U.S. Patent Publication No. 2015/0050923 entitled "Determining Exit From A Vehicle." In one embodiment, a user can set a preference for suppressing all alerts (or certain types of alerts) when the device is in a particular state or classification.

Figure 5:
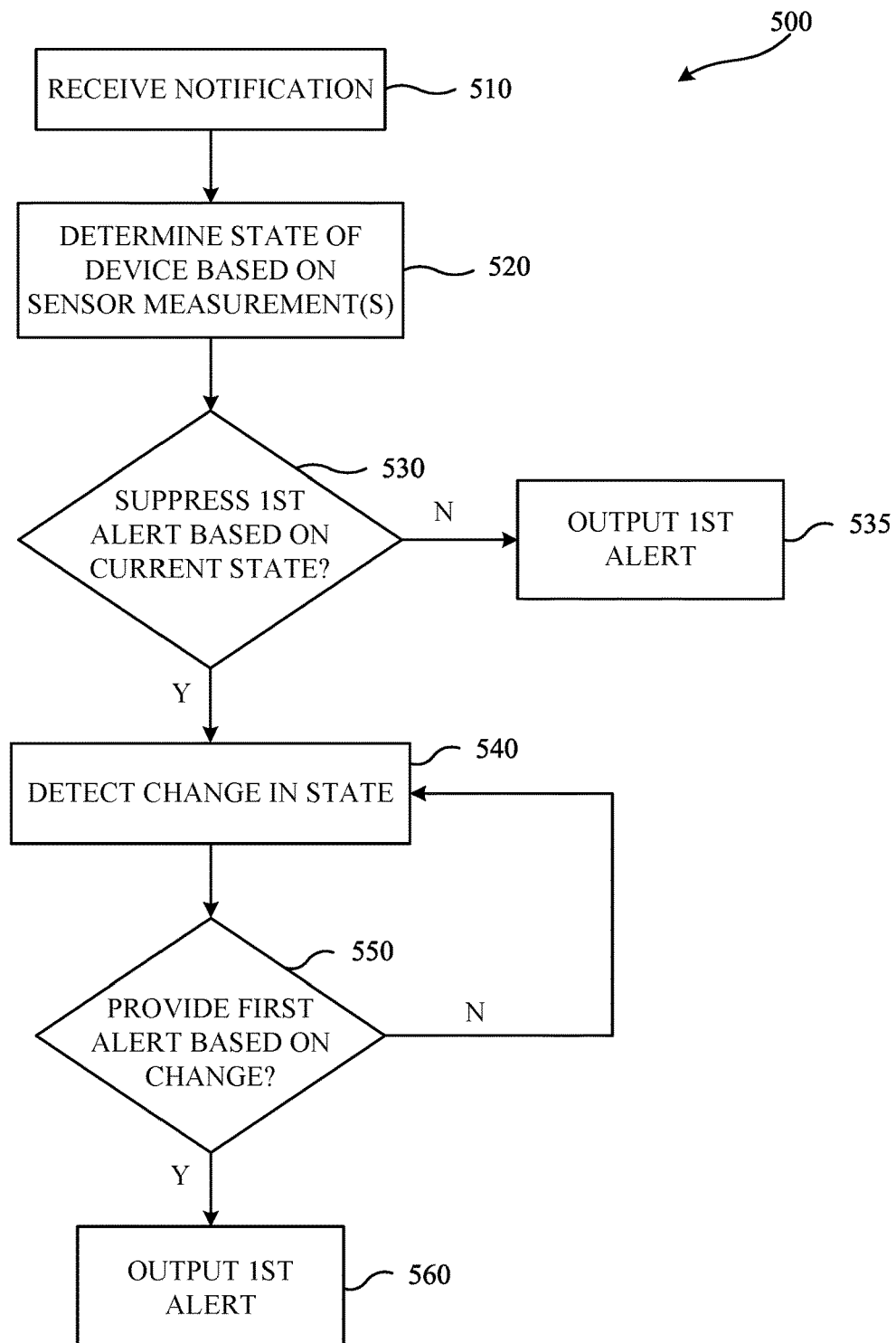
FIG. 5 is a flowchart of a method that potentially suppressed a first alert according to embodiments of the present invention.

FIG. 5 is a flowchart of a method 500 that potentially suppressed a first alert according to embodiments of the present invention. Method 500 can be performed entirely or partially by the device. In one embodiment, method 500 is performed when suppression of a first alert is enabled.

At block 510, a notification is received. The notification can be received in any suitable manner, e.g., as described for block 410 of FIG. 4.

At block 520, a state of the device is determined based on one or more sensor measurements. The state can be determined according to techniques described for FIG. 2. The one or more sensor measurements can be obtained before the notification is received. A state of the device could already be determined, and that current state can be stored. The state could be retrieved when the notification is received.

At block 530, it is determined whether to suppress the first alert based on the current state. The determination of suppression can be made by alert engine 330 of system 300. In some embodiments, the suppression of a first alert can be turned on or off, and may have a default setting. If suppression of the first alert is possible, the current state (which may be a single classification) can be compared to a list of states for which suppression of a first alert is to occur, or equivalently a list for which a first alert is to be provided.

As an example for when suppression of a first alert might be set, the user might be driving. It may be difficult for a user to resist checking the alert, and thus suppression of the alert may be beneficial so that the user does not check the alert.

At block 535, if the first alert is not suppressed, the first alert can be output. The first alert can be output in various ways, e.g., as described herein.

At block 540, a change in state is detected. The change can be detected, as described herein. As examples, a change in a classification of one category can be detected, or a change in multiple classifications.

At block 550, it is determined whether to provide an alert based on the change in state. For example, a new state can be detected, and the new state can be compared to a list of states that trigger a first alert. This list can be the same or different than a list of states for providing a second alert. As another example, the change in state can be required to correspond to one or more particular transitions from one state to another state. A list can specify (designate) transitions of pairs of states for the previous and subsequent state for which an alert is to be provided.

In some embodiments, the probability of the change of state can be used. For example, a probability of being in a new state can determine whether there is sufficient confidence to identify a change in state. This probability can be used, along with information about the possible new state, as may occur for when determining whether to provide a second alert, as described above. If two possible new states would trigger an alert, the two probabilities can be summed for the purpose of providing the alert, which may also be done for providing the second alert.

At block 560, the first alert is output. The first alert can be output in an suitable manner, e.g., as described herein. In some embodiments, a second alert can be provided at a predetermined time after outputting the first alert, suppressed and then output, or not provided at all.

A specific state for suppressing the first alert may have classifications from multiple categories. Thus, in addition to a driving classification, it can be determined what the user interaction (an example of another category) is with the device. If the user is interacting with the device, it can be presumed (or at least have a higher probability) that the particular user is a passenger, and thus the first alert should be provided. Whereas, if the device is also in a mounted state (e.g., in a cup holder, attached to a holder, etc.), then the particular user is likely the driver, and no notification would be provided, in such an example.

V. Dismissal of Second Alert

In some embodiments, a user may have seen the first alert and not want to have a second alert output. For example, a use may be near a phone that is motionless on a table, and see the alert. In such a case, a user might purposefully change the state of the device so as to dismiss a second alert. Or, there may be instances where the state at the time of providing the first alert might indicate that a second alert is not to be provided at all. For example, if a user is in a state of using the device, it can be presumed that the user saw the first alert.

Figure 6:
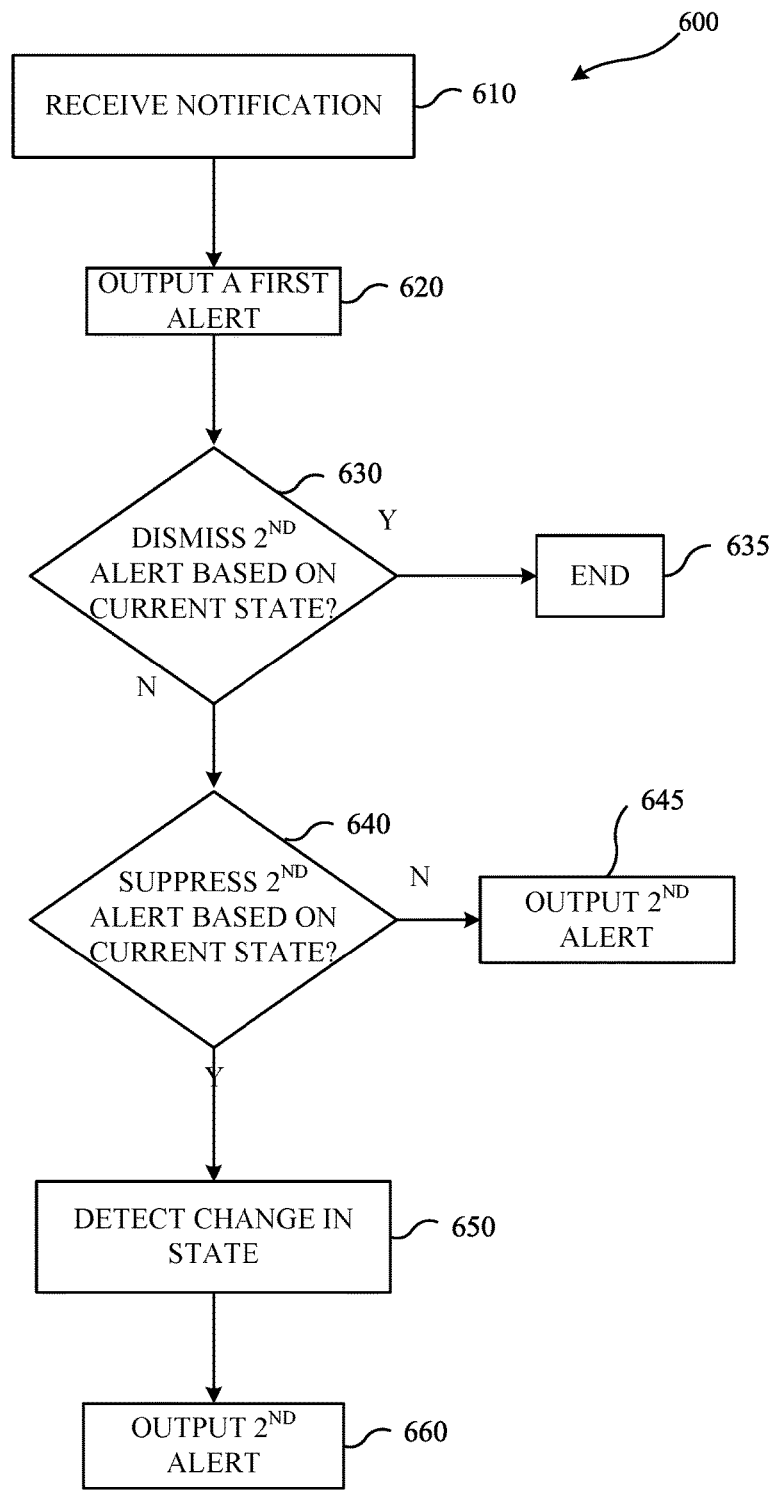
FIG. 6 is a flowchart of a method for dismissing a second alert according to embodiments of the present invention.

FIG. 6 is a flowchart of a method 600 for dismissing a second alert according to embodiments of the present invention. In one embodiment, a mode of operation for whether a second alert may be dismissed can be configurable. Thus, a user may choose to enable a mode that determined whether to dismiss a second alert.

At block 610, a notification is received. The notification can be received in any suitable manner, e.g., as described for block 410 of FIG. 4.

At block 620, a first alert is output. The alert can be output in any suitable manner, e.g., as described for block 420 of FIG. 4.

At block 630, it is determined whether to dismiss a second alert based on a current state. The current state may be the state when the first alert was provided. Or, a state at a later time. Thus, a change in state may be detected, and the second alert can be dismissed based on the change in state. Accordingly, block 630 can be performed multiple times, and may occur after block 640.

The dismissal may be determined by comparing a current state to a list of stated for which a second alert is to be dismissed. Similarly, a particular transition from one state to another state may indicate that the second alert is to be dismissed. A list may specify pairs of previous states and subsequent states for which the second alert is dismissed.

At block 635, if the second alert is to be dismissed, method 600 may end. In such a situation, any storage of the second alert may be deleted.

At block 640, if the second alert is not dismissed, it can be determined whether the second alert is to be suppressed based on a current state. Block 640 can be performed at a specific time after providing the first alert. Block 640 can be performed in a similar manner as block 130 of FIG. 1, and as described herein. For example, sensor measurements can indicate that the device is in an enclosure (e.g., a pocket), and thus it can be determined to not be an opportune moment to provide the second alert.

At block 645, if the second alert is not suppressed, then the second alert can be output. The second alert can be output in any suitable manner, e.g., as in block 135 of FIG. 1. The second alert can be output at a predetermined time after the notification is received or the first alert is provided, which may differ if the first alert was suppressed.

In some embodiments, if the second alert is not suppressed, the device can perform further checks to determine whether the second alert is to be dismissed. The further checks can be done periodically or in response to an even, e.g., a change in state. The change in state can be determined by a state engine (e.g., state engine 220), and the change can trigger a determine of whether to dismiss the second alert. If the second alert is dismissed, then any information for the second alert can be deleted, e.g., from storage 335 of FIG. 3.

At block 650, if the second alert is suppressed, then method 600 can proceed to detect a change in state. The change in state can correspond to a change that is designated to trigger the providing of a second alert. The detection of the change in state and the types of changes in state that trigger the providing of a second alert are described herein.

At block 660, the second alert is output. The second alert can be output in any suitable manner, e.g., as in block 150 of FIG. 1, block 490 of FIG. 4, and block 560 of FIG. 5.

VI. Timing of Providing Alert

Determining whether to provide an alert based on a transition to a new state can use additional information besides the change in state, e.g., a particular new state or a transition from a particular previous state to a particular new state. For example, determining whether to provide an alert can use location. In this manner, the change in state can indicate that a an opportune moment is possible, but further analysis is required. Thus, once the change is identified to correspond to a state where an alert can be provided, other criteria may be determine whether an alert will actually be provided.

Figure 7:
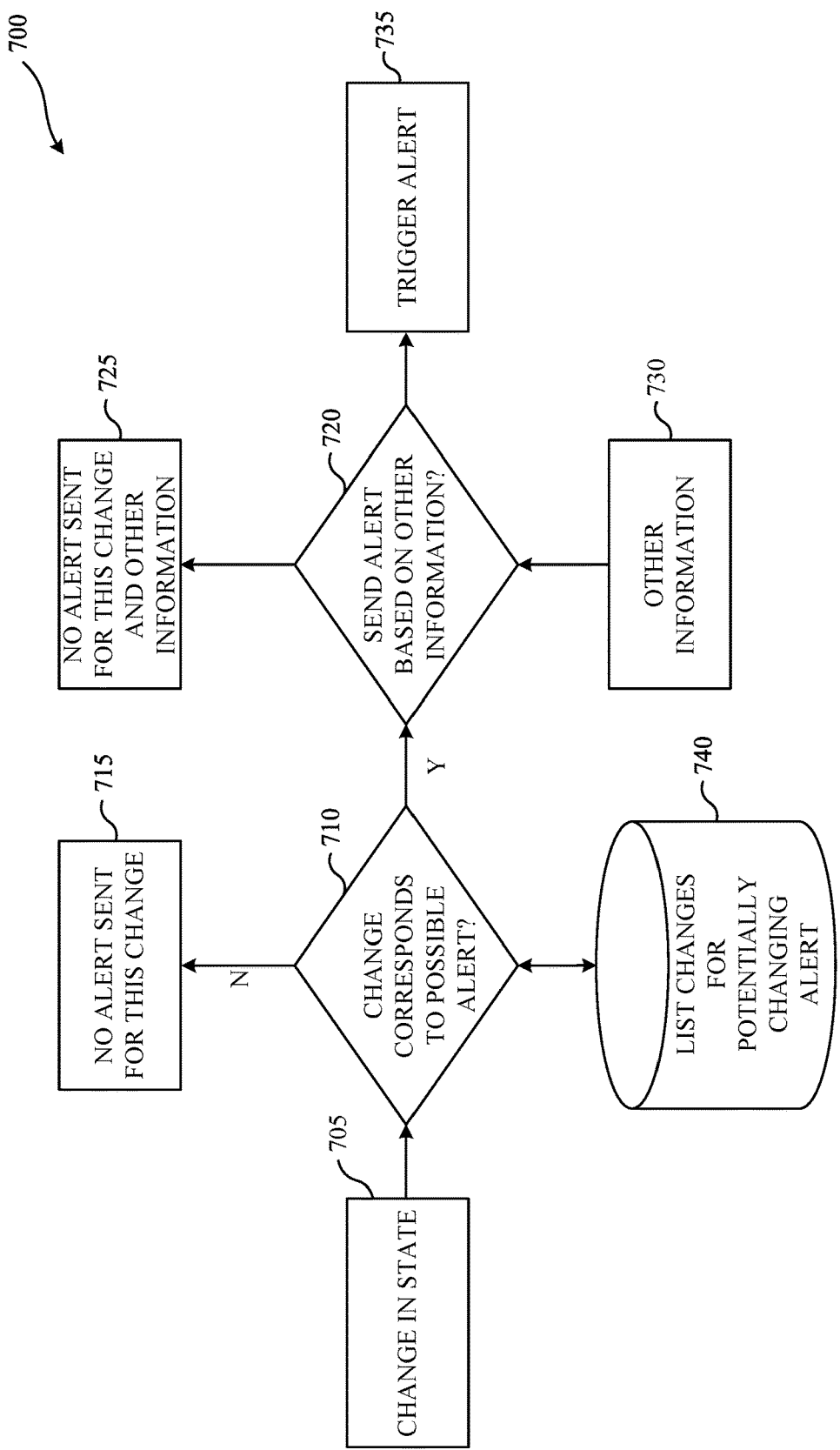
FIG. 7 is a flowchart illustrating a method for determining a time for providing an alert according to embodiments of the present invention.

FIG. 7 is a flowchart illustrating a method 700 for determining a time for providing an alert according to embodiments of the present invention. As examples, method 700 can be implement using modules within alert engine 330, or more specifically in rules engine 337.

At 705, a change in state is received. The change in state can be determined as described herein, e.g., by a state engine. The change in state can be determined based on sensor measurements.

At 710, it is determined whether the change in state corresponds to a change designated for possibly sending an alert (e.g., a state designated for being accessible to the user). In one embodiment, a list of new states or particular pairs of states for the transition (i.e., previous state and subsequent state pair of the transition) can specify whether an alert might be provided. The list of changes can be kept in storage 740. The list may be accessed by an alert engine. Even if the change is a match for an item in the list, the alert is not necessarily provided at that time, or potentially ever, as further analysis is performed to make that determining of when to provide.

At 715, if the change is not designated for providing an alert, then no alert is provided. The process can go back to a state of waiting for another state change. When another state change occurs, then method 700 can repeat.

At 720, if the change is designated for potentially providing an alert, it is determined whether the alert is to be sent. Other information 730 can be received at this point so as to make the determination of whether to provide the alert. For example, a location of the device can be determined at this point. The other information can be already stored on the device, including the location (e.g., from a recent measurement), or obtained at the time of making the determination at 720.

At 725, it can be determined that no alert is to be sent for the particular change in state and the particular other information. The criteria for not sending (or for sending) the alert can depend on the type of change, as well as the other information (e.g., location). If an alert is not provided, method 700 can continue to monitor the other information and make additional determinations when the other information changes. For example, it can be determined that a change in state is a match for providing an alert, but the other information (e.g., location) might indicate that the moment is not opportune. When the other information changes to satisfy specified criteria (e.g., device is within a specified distance of one or more particular locations), then the alert can be provided.

At 735, it is determined that an alert is to be sent, and a trigger signal is transmitted (e.g., an alert engine can transmit a signal to an output routine). For example, an alert engine can monitor location in response to determining that an alert is potentially to be provided at 710, and determine that the location matches one or more criteria. Different types of alerts can have different criteria for the other information, and for the change in state. The alert can be a first alert or a second alert.

The other information and the criteria for determining when to send the alert based on the other information can be learned via historical usage of the device. For example, the device can track when an alert is acknowledged and/or when an application associated with the alert is accessed.

As an example, a particular reminder may be set to occur when the device is in a driving state. Such a reminder may be to go to a particular store (e.g., a grocery store). But, the reminder would not be set just when the device is close to the grocery store, as a car might be required. Thus, the change in state to driving can be first matched to the possibility of sending such a reminder at 710. If the device gets near a designated store, then the alert can be provided.

Some embodiments can use a type of notification. For example, a notification might be from family or a friend. In such a case, even if a change in state indicates that an alert can be sent, the alert might continue to be queued while the user is at work. Conversely, a notification related to work might be kept in the queued storage until the device's location is way from home or near work. The other information can include times of day, e.g., as a proxy for location in the example above.

The other information can also include when another alert is displayed and can include a confidence value for providing an earlier alert for the notification. For example, the confidence for when to provide an alert may not be very high (but high enough to provide the alert) to know the user will definitely get the alert, but may be high enough to still provide the alert. In such cases, the alert can still be kept in a queued storage and provided when a change in state occurs (e.g., a change in state for providing another alert).

Accordingly, a third alert can be provided. For example, the alert may be kept in a storage for a certain amount of time, and if a state change occurs that indicates a higher probability for the device to be accessible (e.g., a higher confidence of knowing the state of the device), then a third alert can be provided. For example, when the confidence of knowing that the a transition has occurred from a running state to a stationary state increases (e.g., higher than a threshold), then a third alert can be provided. The alert can be deleted from storage after a certain amount of time.

VII. Coordination with Other Devices

In some embodiments, a first device can coordinate alerts that are to be presented at a second device. For example, the first device can suppress or dismiss alerts that are to be provided by the second device. Accordingly, the outputting of an alert by the first device can be accomplished by sending the alert to a second device, which can then display, vibrate, and/or play on a speaker. As examples, the first device may be a phone or a tablet and the second device can be a watch or other wearable device.

Figure 8:
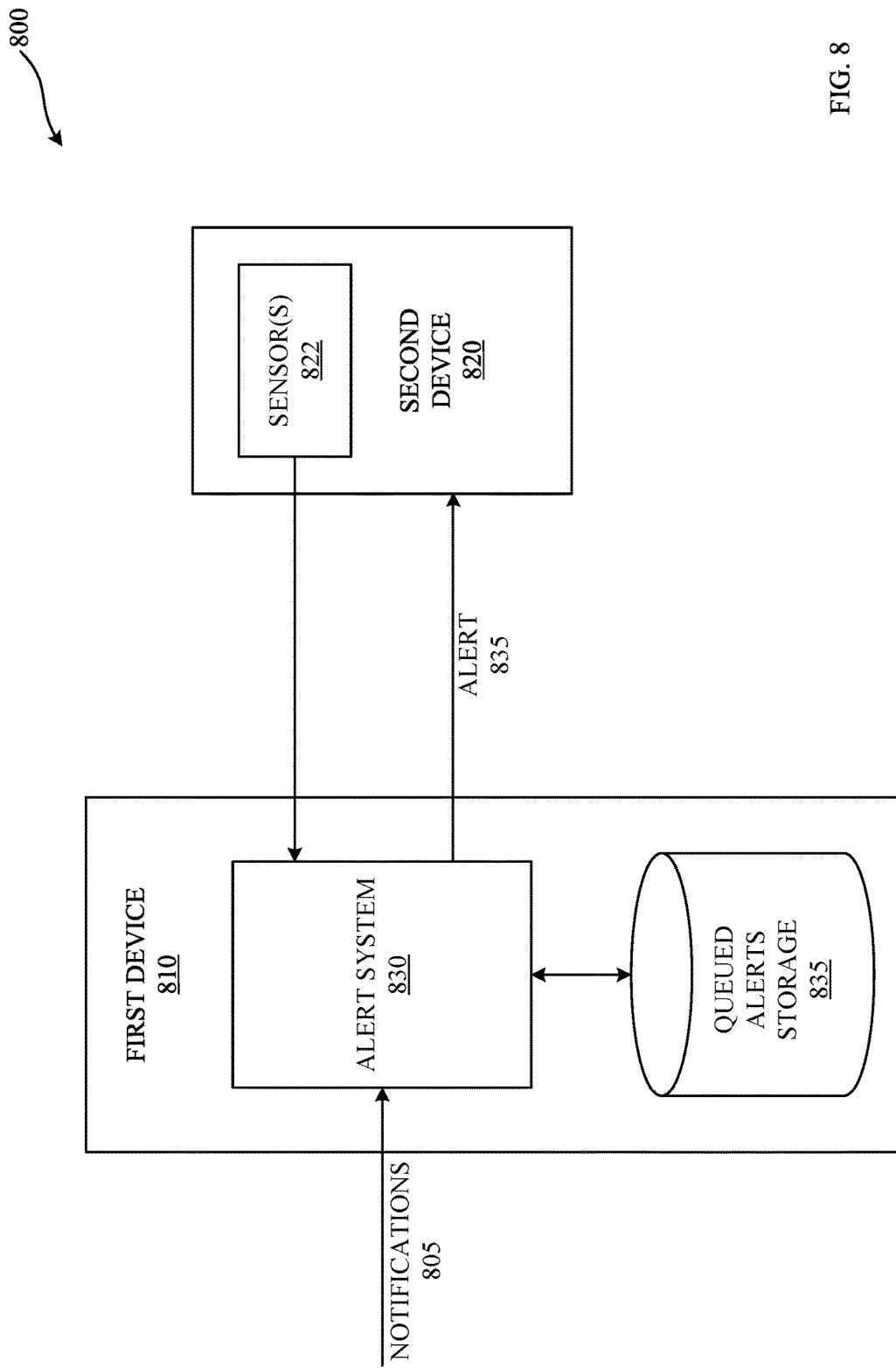
FIG. 8 shows a system illustrating the coordination of alerts from a first device to a second device according to embodiments of the present invention.

FIG. 8 shows a system 800 illustrating the coordination of alerts from a first device 810 to a second device 820 according to embodiments of the present invention. As depicted, one or more notifications 805 can be received at an alert system 830, which can variously include sensors, classifiers, a state engine, and an alert engine, e.g., as described herein. Although depicted as being received from an external source, notifications 805 can also be generated internally by first device 810.

Alert system 830 can suppress alerts and store the alerts in a queued alerts storage 835. The suppressing of alerts can be performed as described herein. For example, first device 810 can obtain sensor measurements, which may be from sensors of the first device and/or one or more sensors 822 of the second device. The sensor measurements can indicate a state of the second device and whether to suppress an alert for the second device.

Alert system 830 can determine to provide the alert to second device 820. This determination can be made after determining to suppress the same alert for outputting to a display, speaker, or other element on first device 810. For example, first device 810 can determine that first device 810 is in a bog, and thus an alert should be suppressed for displaying on first device 810. But, first device 810 may know (or determine) that second device 820 is in communication with first device 810. First device 810 can then determine a state of second device 820. If second device 820 is available (e.g., in a state of being worn), then second device 820 would be accessible to first device 810. However, if second device 820 is in a state of being within an enclosure, then first device 810 can decide not to send an alert to second device 820.

Other states of second device 820 can include motion classifications. These motion classifications can be used to determine whether the device is accessible to a user, e.g., whether the device is being worn. For example, if second device 820 is a watch and a motion classification is walking (which may be determined from a combination of sensors of the watch and first device 810), the motion of the watch would be of a particular type if worn on a wrist, and thus available to the user.

As another example of suppression of alerts, first device 810 can inform second device 820 not to provide any alerts to the user. This may even be alerts corresponding to notifications that are not received by first device 810, e.g., notifications that are generated internally by second device 820 or received directly from an external source. For instance, first device 810 might determine that the user is driving (e.g., based on motion and mounted state), and thus the user should not receive any alerts from second device 820. In this case, first device can also suppress sending any alerts to second device 820, or could send an alert but tell second device 820 not to output the alert.

As yet another example, if the device is not accessible to the person, the second alert might flash the lights in the user's house. Conversely, a smart sensor that detects daily patterns could be used to suppress a second alert until a more opportune moment. For instance, a motion detector in a hallway could be used to determine when a person typically wakes up, and suppress a second alert until after a person is likely to be awake.

VIII. Intensity of Alert

In some embodiments, the intensity (e.g., volume) of an alert can be modified based on a state of a device (e.g., on a first or second device). For example, if the noise classification of a device was medium, then a volume of an alert might set so as to be heard by someone in that noise environment. However, if the noise classification was low, the volume might be lower (but still audible by the user) so as not to startle the user or other people so much. In another example, the alert could just vibrate the device when the noise classification is silent (and potentially when state is in-pocket), as the user is still likely to sense the alert. The level of vibration could increase if a motion classification is running, than if the motion classification is stationary, so as to increase a likelihood of being felt by the user.

IX. User Input (Gestures)

In some embodiments, an alert system (e.g., including classifiers, state engine, and alert engine) can be configured to allow a user to change a state by interacting with the device. In this manner, a user can know how to directly affect a change in state so as to suppress or dismiss an alert. Such user input can allow the user to easily provide the desired functionality. For example, the user could flip the phone face down (e.g., suppress or dismiss) or face up (e.g., to allow alerts). Such an action can be considered a gesture.

As examples of setting suppression, a user might put the device in a mounted state when driving, thereby suppressing all alerts or just second alerts, which may be configurable by the user. Putting the device face down can act to suppress one or more types of alerts. Such user input can also indicate how an alert is to be provided, e.g., face down means that alerts should be provided via vibrate and/or audio and not via display. Other input information can be used to determine how to provide the alert, e.g., based on noise classification. A gyroscope is an example of a sensor that can determine whether the face is down. When the device is rotated again to have a face visible, then an alert can be provided in response to that change ins state.

The user input can include input to a second device. For example, a second device may be operating in a mode to track health data (e.g., heart rate), and thus a state may be exercise. The launching of a health application can also provide such user input for a state of a second device, which can be used to determine a state of the first device. Either device can determine to suppress the first alert or second alert based on this state, and provide an alert after the user is done exercising, e.g., a change in state determined by a change in the health monitoring, which may be turned off by the user at the end of an exercise session.

As examples of dismissing an alert, a user may have seen the first alert and not want to have a second alert output. For example, a use may be near a phone that is motionless on a table, and see the alert. The user could select a button to dismiss a second alert, but also could change a state of the device by moving the device in a particular manner, such as shaking or flipping the device over. Flipping the device over to see a display screen can indicate that the user has seen the first alert, and thus the second alert can be dismissed, without the user having to select a button or interact with the screen.

Similarly, if the device was removed from a bag after the first alert, the device can presume that the user saw the first alert and thus dismiss the second alert. The dismissal might occur upon the change in state from in an enclosure to not being in a disclosure (where such a determination can occur before a predetermined time for providing the second alert). In another embodiment, the dismissal can require that the device is placed back into a disclosure, e.g., back into a pocket.

X. Example Device

Figure 9:
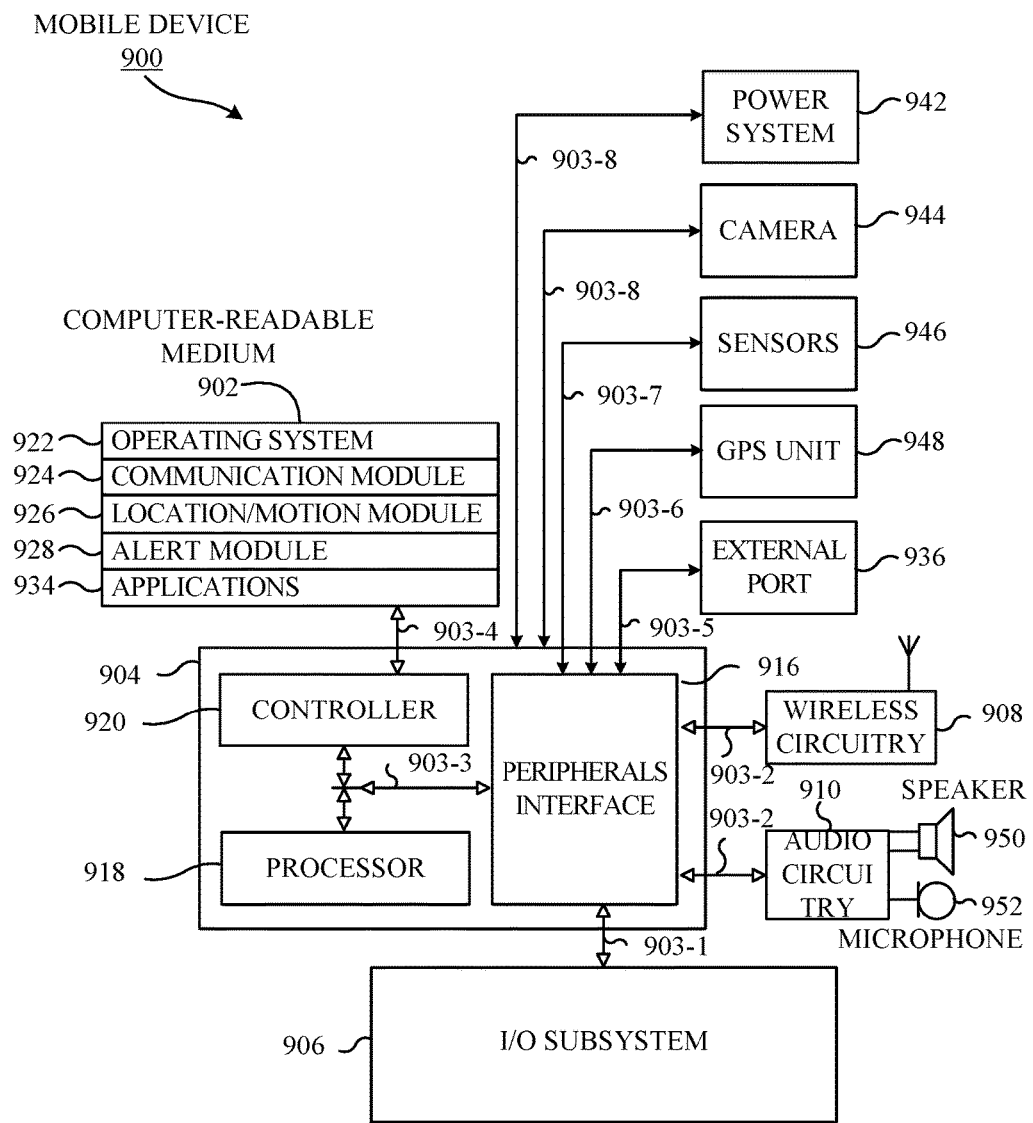
FIG. 9 is a block diagram of an example device.

FIG. 9 is a block diagram of an example device 900, which may be a mobile device. Device 900 generally includes computer-readable medium 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 908 can use various protocols, e.g., as described herein.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, an alert module 928, and other applications (or set of instructions) 934, such as a car locator app and a navigation app.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 60-pin connector, etc.) is adapted for coupling directly to other devices or indirectly over a network (e.g., the Internet, wireless LAN, etc.).

Location/motion module 926 can assist in determining the current position (e.g., coordinates or other geographic location identifier) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

Alert module 928 (or alert system) can include various sub-modules or systems, e.g., as described above in FIGS. 2 and 3.

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A computer-implemented method of providing alerts using a mobile device, the computer-implemented method comprising, at the mobile device:
   receiving an input from a user to enable suppression of a first alert;
   receiving one or more rules for which suppression of the first alert is to occur;
   receiving a notification;
   in response to receiving the notification, determining whether the one or more rules is satisfied, wherein the one or more rules comprise an event, and wherein the event comprises a scheduling reminder saved to the mobile device; and
   in response to determining that the one of more rules is satisfied, suppressing the first alert in accordance with the one or more rules.

2. The method according to claim 1, wherein the one or more rules are configured by a user.

3. The method according to claim 1, wherein, in response to determining that the one of more rules is not satisfied, outputting the first alert.

4. The method according to claim 1, wherein the one or more rules comprises a time window, wherein the first alert is suppressed in accordance with the time window.

5. The method according to claim 1, wherein the one or more rules comprises a category of alerts to suppress, wherein the first alert is suppressed in accordance the category of alerts to suppress.

6. The method according to claim 5, wherein the category of alerts to suppress comprises one from a group consisting of an alarm, a reminder notification, a text notification, an email notification, and a voice message notification.

7. The method according to claim 1, wherein the one or more rules further comprises a time window for the event, wherein the first alert is suppressed in accordance with the event.

8. The method according to claim 7, wherein the scheduling reminder comprises a calendar reminder saved to a calendar of the mobile device.

9. A non-transitory computer readable medium storing a plurality of instructions that when executed control a mobile device including one or more processors, the instructions comprising:
   receiving an input from a user to enable suppression of a first alert;
   receiving one or more rules for which suppression of the first alert is to occur;
   receiving a notification;
   in response to receiving the notification, determining whether the one or more rules is satisfied, wherein the one or more rules comprise an event, and wherein the event comprises a scheduling reminder saved to the mobile device; and
   in response to determining that the one of more rules is satisfied, suppressing the first alert in accordance with the one or more rules.

10. The computer readable medium according to claim 9, wherein the one or more rules comprises a time window, wherein the first alert is suppressed in accordance with the time window.

11. The computer readable medium according to claim 9, wherein the one or more rules comprises a category of alerts to suppress, wherein the first alert is suppressed in accordance the category of alerts to suppress.

12. The computer readable medium according to claim 11, wherein the category of alerts to suppress comprises one from a group consisting of an alarm, a reminder notification, a text notification, an email notification, and a voice message notification.

13. The computer readable medium according to claim 9, wherein the one or more rules further comprises a time window for the event, wherein the first alert is suppressed in accordance with the event.

14. The computer readable medium according to claim 13, wherein the scheduling reminder comprises a calendar reminder saved to a calendar of the mobile device.

15. A mobile device comprising:
a memory; and
one or more processors configured to:
- receive an input from a user to enable suppression of a first alert;
- receive one or more rules for which suppression of the first alert is to occur;
- receive a notification;
- in response to receiving the notification, determine whether the one or more rules is satisfied, wherein the one or more rules comprise an event, and wherein the event comprises a scheduling reminder saved to the mobile device; and
- in response to determining that the one of more rules is satisfied, suppress the first alert in accordance with the one or more rules.

16. The mobile device according to claim 15, wherein the one or more rules comprises a time window, wherein the first alert is suppressed in accordance with the time window.

17. The mobile device according to claim 15, wherein the one or more rules comprises a category of alerts to suppress, wherein the first alert is suppressed in accordance the category of alerts to suppress.

18. The mobile device according to claim 17, wherein the category of alerts to suppress comprises one from a group consisting of an alarm, a reminder notification, a text notification, an email notification, and a voice message notification.

19. The mobile device according to claim 15, wherein the one or more rules comprise an event and a time window for the event, wherein the first alert is suppressed in accordance with the event.

20. The mobile device according to claim 19, wherein the event comprises a calendar reminder saved to a calendar of the mobile device.

* * * * *